United States Patent [19]

Carlsson

[11] Patent Number: 5,062,777
[45] Date of Patent: Nov. 5, 1991

[54] PUMP SEAL ARRANGEMENT ACCESSIBLE FROM THE BASE PLATE

[75] Inventor: Ulf Carlsson, Kristinehamn, Sweden

[73] Assignee: Johnson Pump AB, Orebro, Sweden

[21] Appl. No.: 424,203

[22] PCT Filed: Mar. 8, 1989

[86] PCT No.: PCT/SE89/00110
§ 371 Date: Oct. 12, 1989
§ 102(e) Date: Oct. 12, 1989

[87] PCT Pub. No.: WO89/08782
PCT Pub. Date: Sep. 21, 1989

[30] Foreign Application Priority Data
Mar. 17, 1988 [SE] Sweden .................. 880096

[51] Int. Cl.$^5$ .............................. F04C 27/00
[52] U.S. Cl. ...................... 418/104; 277/81 R; 277/81 S
[58] Field of Search ............ 418/104, 107, 206; 277/5, 8, 38, 81 R, 136, 17, 18; 29/888.03, 402.02

[56] References Cited

U.S. PATENT DOCUMENTS

| | | | |
|---|---|---|---|
| 2,509,912 | 5/1950 | Eliasson | 277/81 R |
| 3,433,489 | 3/1969 | Wiese | 277/81 R |
| 4,145,059 | 3/1979 | Imai et al. | 277/81 R |
| 4,936,821 | 6/1990 | Zuccato | 277/81 R |

FOREIGN PATENT DOCUMENTS

| | | | |
|---|---|---|---|
| 030856 | 7/1986 | Sweden . | |
| 2115491 | 9/1983 | United Kingdom | 418/206 |

OTHER PUBLICATIONS

Buchter, H. *Industrial Sealing Technology* (John Wiley & Sons, New York) 1979, pp. 208–219.

Primary Examiner—Richard A. Bertsch
Assistant Examiner—David L. Cavanaugh
Attorney, Agent, or Firm—Pollock, Vande Sande & Priddy

[57] ABSTRACT

A pump has a housing which is used as a foundation and comprises a working space for product-feeding units. The bearing axles of the units are arranged in bearing sleeves and introduced into the pump housing from the rear so that the axles extend, via front recesses in the pump housing, into the working space for interaction with the units. Sliding ring seals are arranged at the front recesses in order to seal off the working space from the rear of the pump. The pump housing is provided with a removably fitted front gable in order to permit access to the sliding ring seals from the front end of the pump housing. The pump housing is designed as a seat for the rotationally fixed part of each sliding ring seal and interacts with an element which fixes the axial displacement for the rotationally fixed part. The seat and the rotationally fixed part are arranged for simple introduction into and for removal from the seat of the rotationally fixed part. The pump housing has an abutting surface which can interact with the respective bearing sleeve and by means of which the axle can be adjusted in the direction of the longitudinal displacement relative to the seat. A gap between the rear surfaces of the units and an inner limiting wall in the working space can in a simple manner be assigned optimum width by means of adjustment at facing surfaces of the respective bearing sleeve and the pump housing.

11 Claims, 4 Drawing Sheets

PUMP SEAL ARRANGEMENT ACCESSIBLE FROM THE BASE PLATE

TECHNICAL FIELD

The present invention relates to a pump assembly in which the pump housing constitutes the pump foundation and in which the pump housing comprises a working space for product-feeding units, and a casing which belongs encloses parts of the bearing axles of the units projecting backwards from the pump housing, and movement-transmitting elements for the bearing axles, can be fitted in the foundation. Additionally, the pump is of the type in which the bearing axles are pre-arranged arranged in bearing sleeves which, with the casing not mounted, can be anchored from the rear in the pump housing, in rear recesses in the housing, so that the axles extend, through front recesses in the pump housing, into the working space in which they can be connected in a rotationally fixed manner with the units. Also included are sliding ring seals which are arranged at the front recesses in order to seal off the working space from the rear parts of the pump. A front gable/gable section on the pump housing is removably fitted in order to permit access to the sliding ring seals from the front end of the pump housing when the gable/gable section and the units are not mounted.

BACKGROUND OF THE INVENTION

Pumps for puming, for example, foodstuffs and the like are previously known. Such pumps can comprise sealing arrangements for sealing off the working or pump space from the other parts of the pump and in the sealing arrangements there can be used sliding ring seals of known types. In pumps of the type referred to above, to support the product-feeding units/rotors, bearing sleeves are used in which anchoring of the bearing axles can take place. In the pre-assembly of the bearing axles their bearings can be clamped for appropriate rotation and securing of the bearing axles. The bearing sleeves facilitate assembly of the different parts of the pump.

In pumps of this type it is important that the pump can be made with the lowest possible number of parts which are easy to produce and assemble without renouncing the high demands placed on the pump as such. Among other things, it is especially important that the sealing arrangement can be arranged simply and with high reliability. It must be possible to maintain the mutual adjustment of dimensions in spite of a simplified construction and assembly operation. It is also important from the point of view of cleaning and service that a simple removal of mounted sliding ring seals can be carried out, which means that each respective seat and sliding ring seal parts which are located in this or possibly behind this must be designed for easy access and removal of such sliding ring seal parts after removal of the front gable of the pump and the units/rotors.

SUMMARY OF THE INVENTION

The aim of the present invention is to propose pump assembly in which the above problems and others are solved.

The principal characterizing features of an arrangement according to the invention are among others that the pump housing at each of the front recesses is designed as a seat which is assigned to the rotationally fixed part of each sliding ring seal and which is arranged or interacting with an element fixing fixes the axial displacement for the rotationally fixed part, and that the seat and the rotationally fixed part are arranged for simple introduction into and access for removal from the seat of the rotationally fixed part. The rotationally fixed part is arranged in a rotationally fixed manner by means of eccentric design in the rotationally fixed part and the seat. In one embodiment, the rotationally fixed part of the sliding ring seal is arranged with an exposed interacting surface for an extraction element which can be passed over the respective axle from the front end of the pump when the pump is demounted and the respective product-feeding unit is removed. In a second alternative embodiment, each sliding ring seal is provided with an inner rotatable part arranged on a seal holder which is accessible with the extraction device which is in this connection fixed in a corresponding manner. The arrangement is further characterized by the pump housing having an abutting surface which can interact with the respective bearing sleeve and by means of which the axle, and thus the unit in question, can be adjusted in the direction of longitudinal displacement relative to the seat in order to achieve, close to a sealing surface on the rotationally fixed part, which sealing surface is forward-facing and interacts with a movable part of the sliding ring seal, a gap of optimum width between an inner limiting wall in the working space and a rear surface on each unit and thus also a gap between the inner surface of the front gable and the front surfaces of the units.

In one embodiment the element which fixes the axial displacement comprises an inward-projecting flange in the pump housing, at the seat.

In a further embodiment there takes place at the abutting surface interaction with each respective bearing sleeve via an outward-projecting flange on the latter, the gap(s) being defined by means of elements for defining the axial position, e.g. in the form of spacing elements, adjusting screw/adjusting screws etc.

A method of the invention can be characterized by the pump housing being designed with seats for direct interaction with and support for the rotationally fixed parts of the sliding ring seals and with elements which fix longitudinal displacement so that the rotationally fixed parts, upon their introduction, are brought into direct interaction with the pump housing and to or into interaction with the elements which fix longitudinal displacement. A further characteristic is that, close to a forwardfacing sealing surface on the rotationally fixed part, a gap between inner limiting walls in the working space and rear surfaces on the units is defined by means of elements which define the axial position and which are arranged at the abuttable surfaces of the pump housing and the bearing sleeves.

By designing the seats for the rotationally fixed parts of the sliding ring seals directly in the pump housing, the seal can be introduced and function without any special holding elements for the rotationally fixed parts and their functioning in the sliding ring seals. The pump housing also designed with fixing elements for the rotationally fixed parts which can thus be assigned distinct positions in the seats upon assembly. In the case of sliding ring seals with two rotatable parts which interact with a rotationally fixed part at their respective ends, a seal holder is designed for the innermost/rearmost rotatable sliding ring seal part for interaction with an extraction device. Upon cleaning in a demounted pump (the front gable and the units removed), the sliding ring parts in question are easily accessible and removable from the front end of the pump by means of the extraction device. The removal of the rotary ring sealing parts according to the invention does not require the removal of further sealing rings as in the known pump assemblies. The optimum width adjustment of the gap between the rear sides of the units and an inner surface in the working space (and the gap between the inner surface of the gable and the front surface of the units) can also be established in a simple manner according to the invention.

A preferred embodiment of an assembly according to the invention will be described below with reference to the attached drawings in which

DETAILED DESCRIPTION OF THE PREFERRED EMBODIMENT(S)

Figure 1:
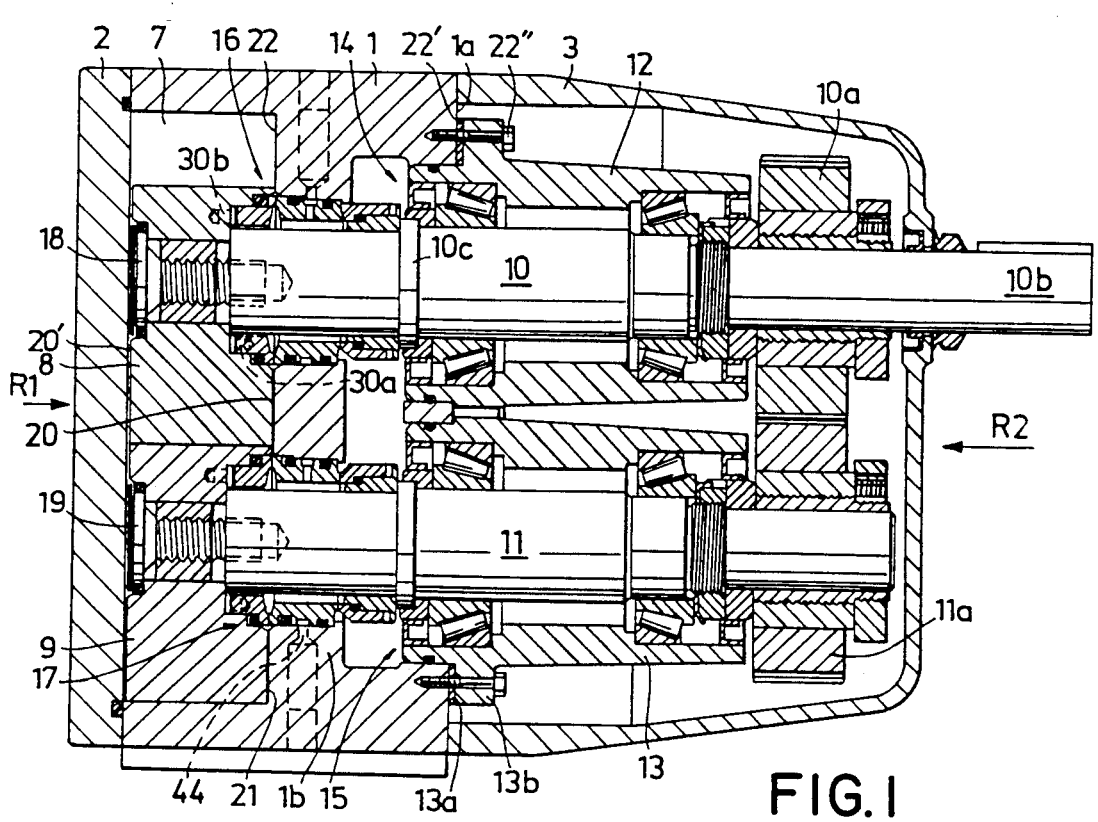
FIG. 1 shows a vertical section of the construction of the pump assembly according to the present invention.
Figure 2:
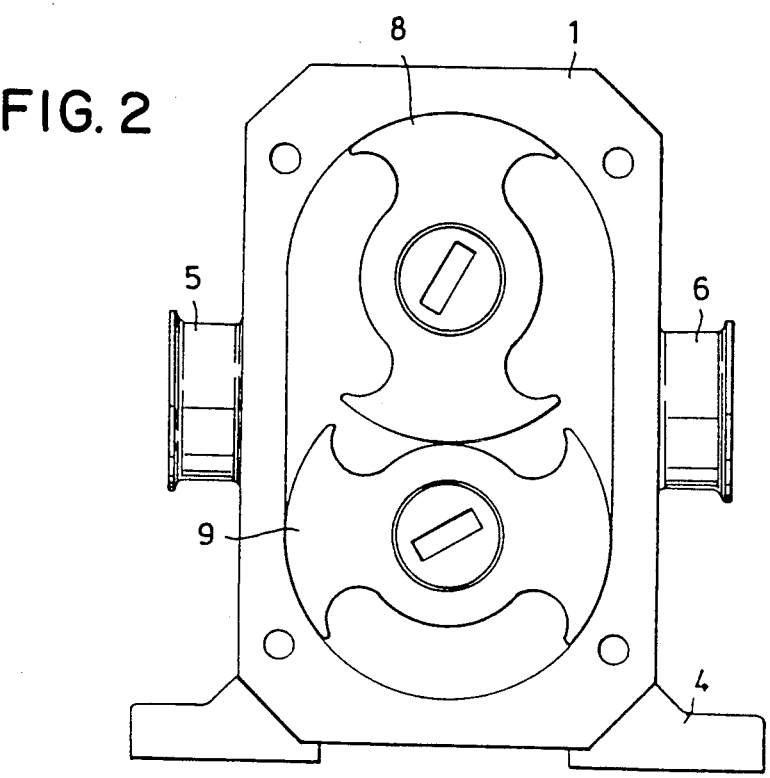
FIG. 2 shows the pump according to FIG. 1 in an end view from the front and with the front gable removed.

In the pump according to FIGS. 1 and 2 the pump housing is indicated with 1, a removable front gable with 2 and a casing which can be fixed to the pump housing with 3. The pump housing forms the foundation pump of the, pump which can be fixed on a suitable place support such as a (mounting plate or other part for supporting a pump) by means of feet 4. The inlet and outlet of the pump are indicated with 5 and 6. The front end of the pump is shown with the arrow R1 and the rear end with the arrow R2.

The pump housing comprises a working or pumping space 7 and can be used to pump foodstuffs, for example, such as milk among other things. The pump constitutes a displacing rotor pump with product-feeding units/rotors.

The units are fitted in bearing axles 10 and 11 respectively. The bearing axles are rotatably arranged in bearing sleeves 12 and 13 in bearings (conical bearings). The bearing axles can be pre-assembled in the sleeves 12, 13 and the sleeves in turn can be introduced into the pump housing from the rear. The bearing sleeves are fitted at rear recesses 14 and 15 respectively in the pump housing so that the axles 10, 11 project into the working space 7 via front recesses 16, 17. The units 8, 9 are removably fitted in the front ends of the axles by means of securing elements 18, 19. At or in the front recesses sealing arrangements are arrabged which comprise sliding ring seals which are described in more detail below with reference to FIGS. 1a, 1b and 1c.

At the rear the axles 10, 11 are provided with gear wheels 10a and 11a which form a synchronizing gear which is known, as well as is the driving principle One axle is extended backwards with a spindle 10b, via which the axles, and thus the units 8, 9, can be driven by means of a drive element (not shown) via the gear.

The casing 3 can be fitted in the pump housing with fixing elements (bolts) of known type which are not shown separately. The bearings in the bearing sleeves are sealed off in known manner with known lip seals which are arranged at each bearing sleeve end.

Gaps 20 between the rear sides 21 of the units and an inner/rear limiting wall 22 in the pump housing 7 can be optimally adjusted by means of spacers (shims) 22' which are arranged between rear surfaces 1a of the pump housing and a surface 13a, facing the rear surfaces, on a flange 13b on each bearing sleeve 12, 13. The spacers are arranged in association with the securing elements 22" (bolts) of the spacer. Alternatively, adjusting screws or other elements for defining the axial position can be used for the bearing sleeves. In the case of spacing elements, a trial assembly is first carried out and the gap thus achieved is measured, whereupon the height/thickness of the spacing element can be defined for optimum size of the gaps 20. The dimension 20, is obtained at the same time for gaps 20' between the inner surface of the gable 2 and the front surfaces of the units.

Figure 1A:
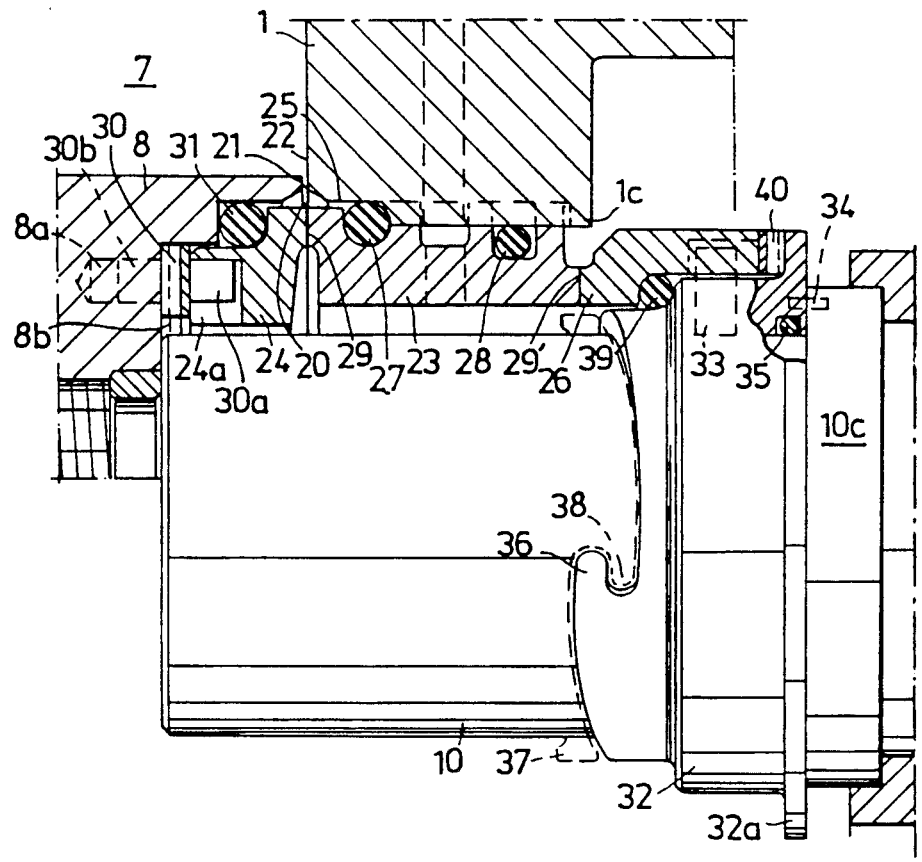
FIG. 1a shows parts of the pump according to FIG. 1, the sliding ring seals used in the pump being shown in greater detail.

FIG. 1a shows a first preferred embodiment of the sliding ring seal which in this case has a rotationally fixed part 23 and two rotatable parts 24, 26. The pump housing itself is made with an accurately machined seat 25 for the part 23. The front,recesses 16, 17 (FIG. 1) are arranged in an intermediate wall 1b in the pump housing. The length of the seat corresponds substantially to the width of the intermediate wall. At the rear parts of the rear recesses the wall is provided with edges 1c projecting inwards which form the elements which define the axial displacement for the rotationally fixed part 23.

The part 23 is sealed off from the surface 25 of the seat by means of elastic elements 27, 28. The surface of the seat is worked to such a degree and the element/elements 27, 28 have such external dimensions and such elasticity that the part 23 is easily introducible and easily removable, at the same tile as a high quality can be maintained for the sealing function. The rotationally fixed part 23 has a front sealing surface 29, via which interaction takes place with the rotatable part 24. The eaid part 24 is anchored to the unit in question so that it can follow the rotation of the unit. The driving function for the part 24 is brought about by means of an ondular washer 30 which is described in greater detail in connection with FIGS. 4a-4b. The ondular washer comprises two studs 30a and 30b respectively which project from the washer in opposite directions. The first stud 30a engages with the part 24 via a recess 24a. The second stud 30b engages in a corresponding manner in a recess 8a in the unit. In a preferred embodiment each unit 8, 9 is provided with a side recess 8b, in which the ondular washer 30 and rotatable part 24 are arranged. In the recess, the part 24 is sealed off against sealing surfaces in the unit by means of an elastic seal 31. The seals 27, 28, 31 can be made from Viton, amide, rubber and the like. The gaps and spaces between the seals, like the gap 20, are arranged for easy access with detergents which, upon cleaning without dismantling of the pump, are introduced into the space 7. The gap 20 must also have an optimum width which ensures the stated pumping effect of the pump. The rotationally fixed part interacts via a rear sealing surface 29' also with the part 26. In front of the part 26 there is arranged a seal holder 32 which is provided with a driving element (pin) 33 for the part 26. The seal holder 32 is arranged in a rotationally fixed manner on a flange 10c of the axle 10 by means of one or more drive elements 34. The seal holder is sealed against the axle by means of an elastic seal 35. The seal holder is provided with an element 36 which can interact with an extraction device 37 which is designed as a sleeve, in the end of which are arranged elements 38 which correspond to the element 36 and can be brought into interaction with it. The sleeve is so arranged that it can, be passed over the free end of the axle when the rotor 8 is removed, just as the sealing parts 23 and 24 which are situated in front. By means of this special design of the seal holder the part 26 supported on the seal holder, together with the seal holder, can be easily removed from the pump housing with the extraction device. The seal holder is formed at its front part with a lowered section, the external dimensions of which correspond to the external dimensions of the extraction device. In the transition section between the lowered part and the unlowered part of the seal holder there is arranged a further elastic seal 39 of known type. The driving pin 33 is arranged on the unlowered part. At the rear the seal holder is provided with a rear edge 32a which projects outwards. Between the said rear edge and the rear surface on the part 26 there is arranged an ondular washer 40. This ondular washer presses the part 26 against the rotationally fixed part 23. In a corresponding manner the ondular washer 30 presses the part 24 against the rotationally fixed part 23.

Figure 1B:
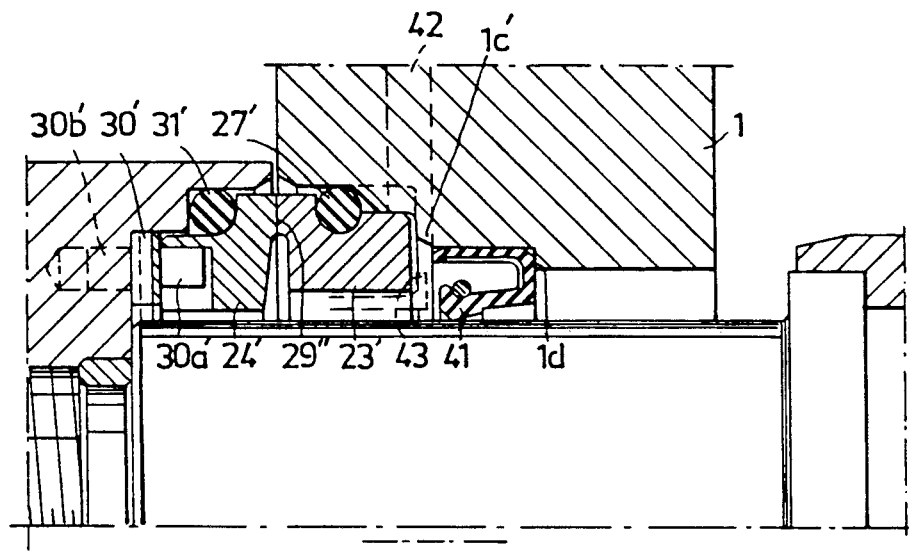
FIG. 1b shows a second embodiment examplo of the sealing arrangement for the pump according to FIG. 1.
Figure 3A:
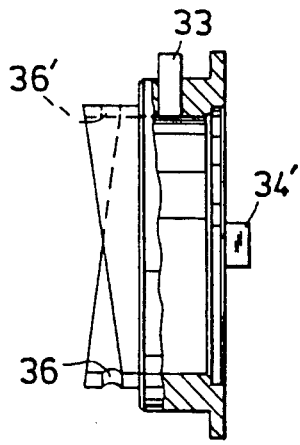
FIGS. 3a-3d show different views and sections of a sealing ring holder forming part of the pump according to FIG. 1, FIGS. 4a-4b show side and horizontal views of an ondular washer forming part of the pump according to FIG. 1, and FIGS. 5a-5b show in longitudinal section and end view the design of the rotationally fixed part of the sliding ring seal in the pump according to FIGS. 1 and 1b.
Figure 3B:
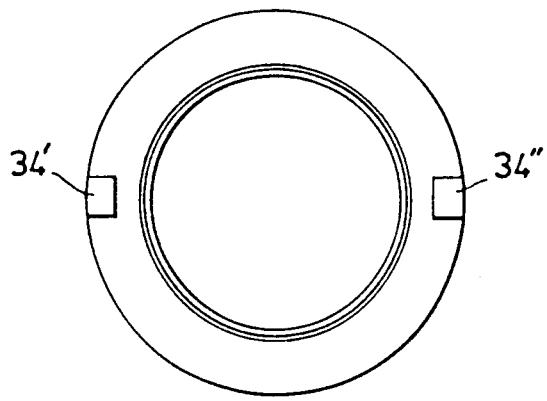
Figure 3C:
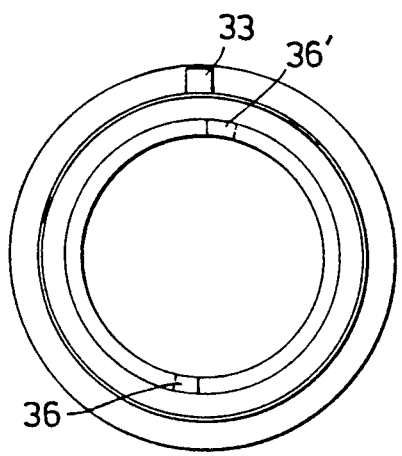
Figure 3D:
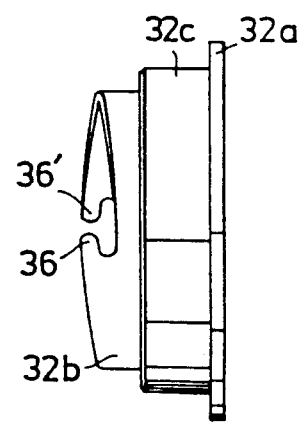

The embodiment according to FIG. 1b shows a second embodiment of the sliding ring seal. The rotationally fixed part 23' interacts in this case only with a co-rotational part 24'. The second (innermost) co-rotational part 26 in FIG. 1a is omitted in this case. In the embodiment according to FIG. 1a rinsing (with steam) in the space between the outer side of the axle 10 and the inner side of the seal 23, 24 and 26 is made possible by virtue of channels which are shown with broken lines. If it is to be possible for such rinsing to be effected in the space with water, it is necessary in the case according to FIG. 1b to fit a lip seal 41 which is positioned behind the part 23, If there is no requirement to rinse via a channel 42, correspondingly the lip seal 41 can be omitted. The pump housing 1 is provided with a recess 1d for the lip seal 41. There is also a stop element 1c' in this embodiment which apart from the stated differences is otherwise identical with the embodiment according to FIG. 1a.

FIGS. 3a-3d show the design of the seal holder 32 in detail. According to the Figures it emerges that the element 36 has a counterpart 36' located diametrically on the lowered section 32b of the holder. The unlowered section of the holder is indicated with 32c. The holder has two diametrically located heels 34' and 34" which can interact with the axle flange 10c via corresponding recesses which are not shown separately.

Figure 4A:
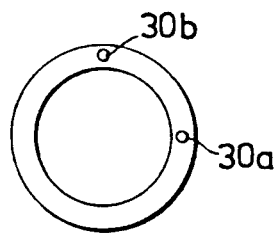
Figure 4B:
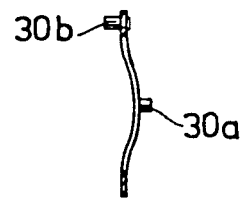

The design of the ondular washer 30 according to FIG. 1a is shown in FIGS. 4a-4b. The studs, which in FIG. 1a are shown as being located in front of one another, are in the preferred case placed at 90° in relation to one another. The manner of representation according to FIG. 1a is used in order to show the principle simply. Each projecting part 30a and 30b is fixed by riveting in the washer material and the ondular washer has the form of a ring which, in the view according to FIG. 4b, is raised in its middle sections in relation to the outer sections.

Figure 5A:
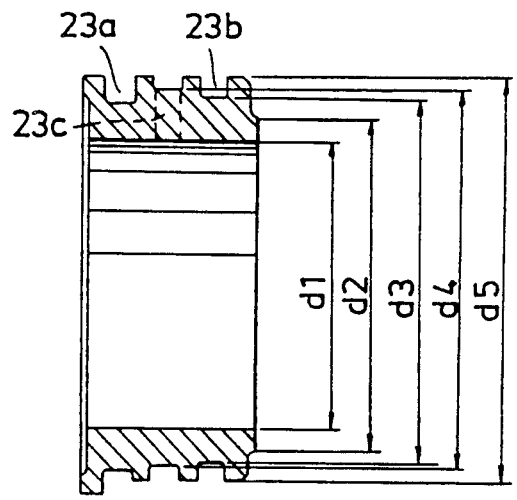
Figure 5B:
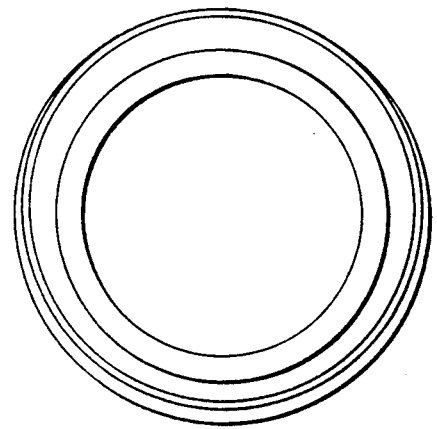

FIGS. 5a-5b show examples of the design of the rotationally fixed part of the sliding ring seal according to the embodiment in FIG. 1a. The ring is provided with two recesses 23a and 23b for the sealing elements 27 and 28 respectively. The ring also has a channel 23c for the rinsing function referred to above. In FIG. 5a, five different diameters are indicated with d1-d5. The outermost of these diameters d3, d4 and d5 are assigned to eccentric positions. The eccentricity can be, for example, between 0.5-1.0, preferably approximately 0.75 mm. The seat which supports the sliding ring seal part shown in FIG. 5a is designed with a corresponding eccentricity. In such a manner a rotationally fixed insertion of the seal in question is achi means that it is not necessary to use an additional stop element. The sliding ring seals according to the above are made of hard coals or corresponding material which can be used in this connection. The elastic seals 27, 27,, 28, 31, 31, have a Shore number within the range 60-80. In the case of the sealing arrangement according to FIG. 1b, the seal part 23 is arranged with an exposed rear surface which is accessible for the extraction device 43.

By virtue of the construction as above a simple method for manufacturing the pump is made possible. The pump housing is designed with seats for the rotationally fixed parts of the sliding ring seals, the seats being worked for an appropriate sealing function and easy introduction into and removal from the seat with at the same time a reliable sealing function. The bearing axles for the product-feeding units are pre-assembled in bearing sleeves which are fitted with fixing elements into the pump housing, the introduction being effected from the rear. Fitting in of the gear takes place in association with this. Subsequently there are introduced any inner sealing elements in the form of co-rotational rotatable parts which are each located or a seal holder which is firmly fixed (co-rotational) to the respective bearing axle and to the respective rotational part. Alternatively any lip seal can be fixed. The eccentrically designed rotationally fixed parts of the sliding ring seals are fixed in the similarly eccentrically designed seats. The units with the outer co-rotational parts of the sliding ring seals already fitted are fixed on the front ends of the axles. Adjustment of the gaps 20 and 20' is carried out. The front gable is secured in the pump housing, as is the casing 3.

The invention is not restricted to the embodiment represented above as an example, but may be subjected to modifications within the scope of the following patent claims and the inventive idea.

I claim:

1. A pump assembly comprising:
   a pump housing which constitutes the pump's foundation for mounting said pump assembly on a support means;
   said housing defining a working space therein for product-feeding units and having a front and rear portion, front and rear recesses provided in said front and rear portion of said pump housing and a front gable having at least a gable section removably fitted to said front portion of said pump housing;
   a casing connected to said rear portion of said pump housing for enclosing parts of bearing axles of said units projecting from said housing, which are adapted to be fitted through said rear recesses prior to connection of said casing to said pump housing and for extending through said working space and into said front recesses, said axles being connected in a rotationally fixed manner to said units;

movement-transmitting elements for the axles supported in the pump housing;

sliding ring seals arrangements provided at said front recesses for sealing off said working space from rear parts of said pump, said sliding ring seals arrangements being accessible from said front portion of said housing through said removable gable section, sliding ring seals of each arragnement including a rotationally fixed part and at least one rotatable part;

a seat member provided at each of said front recesses of said pump housing for supporting said rotationally fixed portion of said sliding ring seal and adapted for interacting with an element for fixing axial displacement of said rotationally fixed part;

each of said sliding ring seals arrangements also including an exposed rear surface which is accessible to an extraction tool for extraction of said sliding ring seals arrangement, said extraction element being insertable over a respective axle from the front portion of said pump upon removal of said removable gable section and respective product-feeding unit;

an abutting surface provided in said pump housing for interacting with respective bearing sleeve for adjustment of the position of said axle and corresponding unit in a direction of longitudinal displacement with respect to said seat for providing a gap of predetermined width between an inner limiting wall in said working space and a rear surface of said each unit and a gap between an inner surface of said front gable and end surfaces of said units.

2. A pump assembly according to claim 1, wherein said rotationally fixed part is arranged in said rotationally fixed manner by means of fixing elements.

3. A pump assembly according to claim 2, wherein said rotationally fixed part is arranged in said rotationally fixed manner by means of built-in eccentricity in said rotationally fixed part and in said seat.

4. A pump assembly according to claim 1, wherein the pump housing at said seat is designed with an edge projecting inwardly which forms said element for defining said axial displacement.

5. A pump assembly according to claim 1, wherein said abutting surface interacts with each respective bearing sleeve via an outward-projecting flange on said sleeve and wherein said gap is definable by means of elements for defining the axial position.

6. A pump assembly according to claim 2, wherein said abutting surface interacts with each respective bearing sleeve via an outward-projecting flange on said sleeve and wherein said gap is definable by means of elements for defining the axial position.

7. A pump assembly according to claim 1, wherein said elements for defining the axial position are spacing elements.

8. A pump assembly according to calim 3, wherein said abutting surface interacts with each respective baring sleeve via an outward-projecting flange on said sleeve and wherein said gap is definable by means of elements for defining the axial position.

9. A pump assembly according to claim 1, wherein asid elements for defining the axial position are adjusting screws.

10. A pump assembly according to claim 1, wherein said sliding ring seals arrangement includes in a direction from said front towards said rear portion of said pump housing an inner rotatable part, rotationally fixed part and an outer rotatable part.

11. A pump assembly according to calim 10, wherein said exposed surface for extracting by said extraction tool is provided on said inner rotatable part.

* * * * *